Oct. 2, 1962

C. J. PETERS 3,056,906

SWITCHING CIRCUIT

Filed Dec. 28, 1959

2 Sheets-Sheet 1

INVENTOR.
CHARLES J. PETERS
BY
Spencer E. Olson
ATTORNEY

INVENTOR
CHARLES J. PETERS

BY Spencer E. Olson
ATTORNEY

United States Patent Office 3,056,906

Patented Oct. 2, 1962

3,056,906

SWITCHING CIRCUIT

Charles J. Peters, Wayland, Mass., assignor to Sylvania Electric Products Inc., a corporation of Delaware Filed Dec. 28, 1959, Ser. No. 862,335

10 Claims. (Cl. 317—123)

This invention relates generally to switching circuits, and is more particularly concerned with a circuit for rapidly and simply switching current from one inductance to another.

The invention is based on the control characteristics of the silicon controlled rectifier, a recently available semiconductor power switch having features similar to a thyratron. Some types of the controlled rectifier have the ability of withstanding forward and reverse voltages up to 350 volts without breakdown, and when triggered on, of conducting large currents, in the forward direction only, of the order of 16 to 30 amperes, with a voltage drop of only a few volts. The device combines the features of a power transistor and a rectifier, having an anode and cathode, and a gate electrode for controlling its conduction. A low power level current in the gate-cathode circuit acts to switch the rectifier into the conducting state even though an anode voltage of less magnitude than the forward breakdown voltage is impressed on the cell.

Other features of the silicon controlled rectifier (SCR) making it particularly useful for switching applications is its completely static operation with attendant high reliability and long life. It fires and recovers quickly, and not having a filament eliminates warm-up delay.

It is the object of the present invention to provide a switching circuit for transferring current from one inductance to another.

Another object of the invention is to provide a switching circuit having the ability of rapidly transferring the current from one circuit branch to another without applying a disabling signal to the branch from which the current is to be transferred.

Another object of the invention is to provide a switching circuit having the foregoing characteristics and adapted to switch current from one to another of any desired number of circuit branches.

Another object is to provide a switching circuit for inductive elements which avoids the destructive high peak voltages which frequently occur in switching inductive loads.

Another object is to provide an efficient switching circuit for inductive elements in which the energy withdrawn from one inductive element in extinguishing the current in that element is stored and used later to rapidly establish the current in another inductive branch.

Other objects and features of the invention will be apparent from the following detailed description, taken in conjunction with the accompanying drawings, in which.

Figure 1:
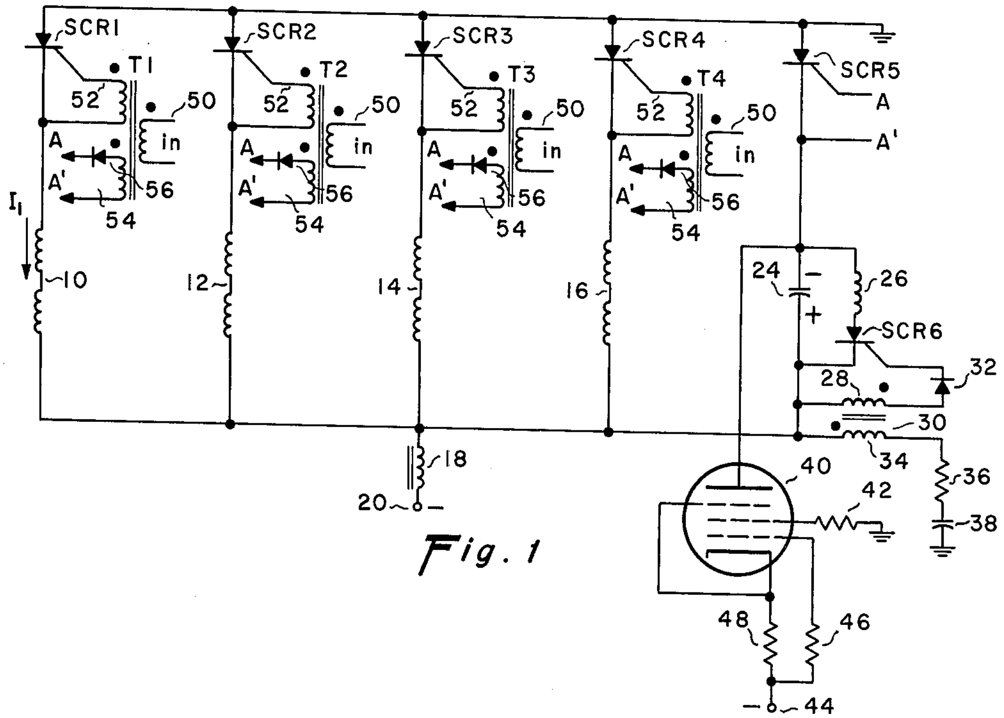
FIG. 1 is a circuit diagram of a representative switching circuit embodying the invention.

In the drawing is illustrated a circuit having four parallel branches respectively including coils 10, 12, 14 and 16 among which the current is to be switched. That is, the circuit is adapted to conduct current in only one of these branches at a time, and upon application of a control signal to a selected one of said branches to transfer the current to the selected branch. The circuit is particularly useful for the control of an electromagnetically activated tape transport mechanism for a magnetic tape machine of the type disclosed in application Serial No. 861,012, filed December 21, 1959 by the present inventor and assigned to the assignee of the present application, and now abandoned in favor of continuation-in-part application Serial No. 123,931, filed June 28, 1961, but it is to be understood that it is not limited to this application. In the application referred to the coils 10, 12, 14 and 16 are coils of electromagnets associated with two driving stations and two braking stations, with control transferred from one station to the other by switching current from one coil to the other.

Each of coils 10, 12, 14 and 16 is connected in series with a silicon controlled rectifier respectively designated SCR1, SCR2, SCR3, and SCR4, between ground potential and through a common inductor 18 to a source of negative potential at terminal 20. For reasons which will be seen later, in a practical circuit the source represented by terminal 20 may have a potential of about −6 volts and a current capacity of about 30 amperes. Connected in parallel with the series combinations of a coil and a silicon controlled rectifier is a capacitor 24, also connected in series with a silicon controlled rectifier SCR5, and in parallel with capacitor 24 is a series combination of inductor 26 and silicon controlled rectifier SCR6. The secondary winding 28 of a pulse transformer 30 is connected in series with a diode 32 in the gate-cathode circuit of controlled rectifier SCR6. The primary winding 34 of the pulse transformer is connected from the negative bus of the circuit to ground through a differentiating network consisting of resistor 36 and capacitor 38. The anode of a pentode 40 is connected to the junction of capacitor 24 and its associated silicon controlled rectifier SCR5. The suppressor grid of the tube is connected to the cathode, the screen grid is connected to ground through resistor 42 and the control grid and cathode are connected to a source of negative potential, represented by terminal 44, through resistors 46 and 48, respectively. In a circuit which has been satisfactorily operated, a potential of −175 volts was applied to terminal 44 with resistors 46 and 48 having values of 1000 ohms and 100 ohms, respectively.

Four transformers $T_1$ through $T_4$, each having a primary winding 50 and two secondary windings 52 and 54 are respectively associated with the silicon controlled rectifiers SCR1 through SCR4. The primary winding 50 of each of the transformers is coupled to a corresponding source of positive pulses for controlling the SCR's. Each of the secondaries 54 is connected in series with a diode 56 and to the terminals A and A′ which, in turn, are respectively connected to the cathode and gate electrodes of SCR5. The secondaries 52 are connected in the gate-cathode circuit of the silicon controlled rectifiers SCR1 through SCR4.

Assume, for example, that full current is flowing in coil 10 and that the current is to be transferred to coil 14. With current flowing in coil 10, and all of the other SCR's non-conducting, capacitor 24 will have been charged to a large negative voltage by current supplied by pentode 40, which acts as a source of current. To initiate the current transfer to winding 4, a positive pulse is applied to the primary 50 of pulse transformer $T_3$. The secondary 52 of pulse transformer $T_3$ supplies a gating pulse to SCR3 of a duration such that it will be positive at the appropriate time, as will be seen later. The other secondary 54 of transformer $T_3$ supplies a coincident gating signal to SCR5. Conduction of SCR5 effectively connects capacitor 24 across coil 10, and hence applies a large voltage thereacross. The application of this large voltage to the resulting series connected L-C circuit sets in motion a harmonic transient during the first quarter cycle of which the current in coil 10 is decreased to zero and SCR1 extinguished, and during the next quarter cycle of which the current is transferred to the branch which contains the triggered SCR; i.e., SCR3 and coil 14.

Figure 2:
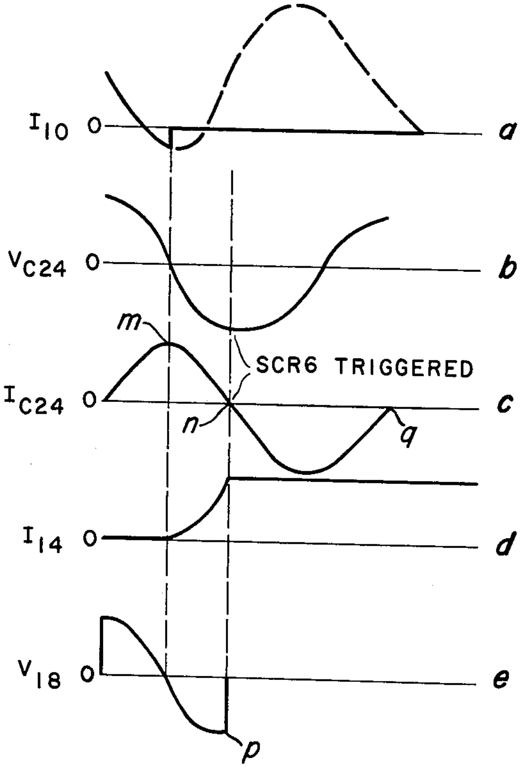
FIG. 2 are a series of wave forms useful in explaining the operation of the circuit of FIG. 1.
Figure 5:
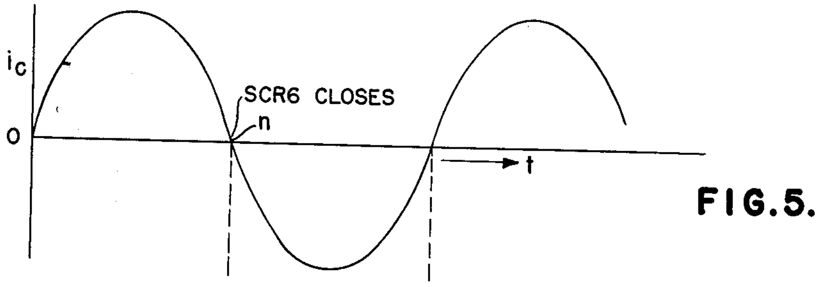
FIGS. 4 and 5 are waveforms illustrating the operation of the circuit of FIG. 3.
Figure 6:
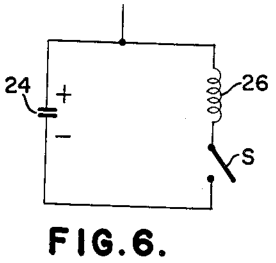
FIG. 6 is a simplified illustration of another portion of the circuit of FIG. 1.
Figure 3:
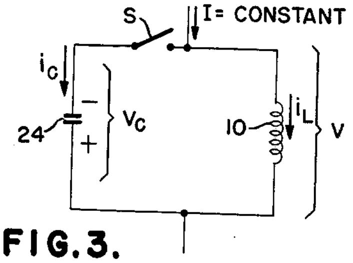
FIG. 3 is a simplified illustration of a portion of the circuit of FIG. 1 useful in explaining its operation.

The transient variations of current and voltage in the circuit of FIG. 1 will be better understood from the simplified circuit diagrams of FIGS. 3 and 6, and the waveforms of FIGS. 2, 4, 5 and 7. In the following analysis, small losses in the circuit, since they do not materially affect the switching action, will be ignored. In FIG. 3, only the parallel combination of capacitor 24 of capacity C and coil 10 of inductance L is illustrated, it being assumed that current is flowing in coil 10. Current is supplied to the circuit by a constant current source, which in the circuit of FIG. 1 comprises the voltage source represented by terminal 20 and inductor 18, the latter having a value of inductance substantially larger than that of the coils. In the initial condition of the circuit, with switch S open, the current $i_L$ in coil 10 is equal to I, and the voltage $v$ across capacitor 24 is equal to $-V_c$.

Applying Kirchhoff's Law, a differential equation can be written which describes the circuit behavior when the switch S is closed:

$$I-C\frac{dv}{dt}-\frac{1}{L}\int v\,dt=0 \qquad \text{Eq. 1}$$

The solution of this equation which fulfills the initial conditions is:

$$v=-V_c\cos\omega t \qquad \text{Eq. 2}$$

where $$\omega=\frac{1}{\sqrt{LC}}$$

The current in the capacitor 24, after the switch is closed, is:

$$i_C=C\frac{dv}{dt}=V_cC\omega\sin\omega t \qquad \text{Eq. 3}$$

and the current in the inductance 10 is:

$$i_L=\frac{1}{L}\int v\,dt+k=\frac{-V_c}{L\omega}\sin\omega t+I \qquad \text{Eq. 4}$$

It is to be noted that the polarity of the voltages measured in the circuit of FIG. 1 as shown in FIG. 2, are opposite to that given by the previous equations. In the practical circuit of FIG. 1, it is convenient to ground the positive terminal of the power supplies. The voltage waveforms of FIG. 2 are measured with respect to ground.

Since $$\omega=\frac{1}{\sqrt{LC}}$$

Eq. 4 can be rewritten, $$i_L=I-V_c\sqrt{\frac{C}{L}}\sin\omega t \qquad \text{Eq. 5}$$

from which equation it is evident that the current in the inductance (coil 10) is a D.C. current superimposed on an A.C. current. If the coefficient $$V_c\sqrt{\frac{C}{L}}$$

is smaller than I, the current is always positive, and if $$V_c\sqrt{\frac{C}{L}}$$

is less than I, the current is negative for a portion of each cycle. For the current in the inductance to have a minimum value of zero, I must just equal $$V_c\sqrt{\frac{C}{L}}$$

or rewritten, $$\frac{V_c^2}{I^2}=\frac{L}{C} \qquad \text{Eq. 6}$$

Figure 4:
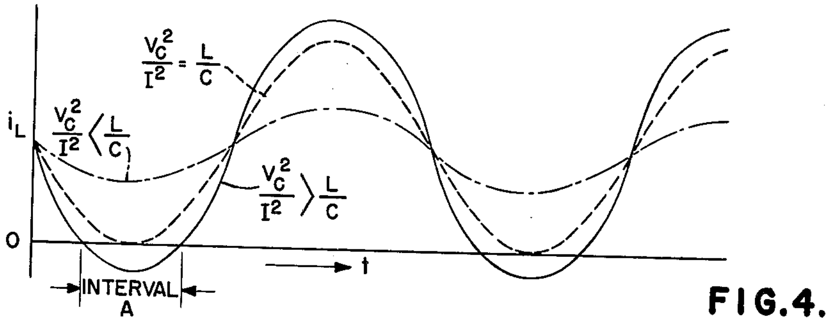

The currents in the inductance for different relative values of L and C are shown in FIG. 4.

It will be appreciated that after closure of the switch S in the circuit of FIG. 3, the oscillating current would continue indefinitely. In the circuit of FIG. 1, however, where the parameters are chosen so that $$\frac{V_c^2}{I^2}$$

is greater than $L/C$, SCR1 in series with the inductance 10 prevents reversal of the current during the period designated "Interval A" in FIG. 4, with the result that the current $i_L$ remains at zero during this interval. Stated another way, during the interval A, SCR1 in effect removes the coil 10 from the oscillatory circuit. At the end of interval A any inductance can be substituted for the inductance previously in the circuit without disturbing the orderly progress of the transient. If the new inductance has the same value the variation in current will follow the curve of FIG. 4; if different, the new transient will follow a sinusoid with a different period. This substitution of one inductance for another is accomplished in the circuit of FIG. 1 by applying a gating pulse to the SCR in the branch containing the second inductance and turning off the SCR in the branch containing the first inductance.

The current in the capacitor of the simple circuit of FIG. 3 is simply the supply current minus the current in the inductance, $$i_c=I-i_L$$

During the transient, the capacitor current varies as shown in FIG. 5, and in the circuit of FIG. 3 would continue indefinitely. In the circuit of FIG. 1, however, the opening of SCR5, which is in series with the capacitor 24, prevents the capacitor current from going negative, thus terminating the transient at point $n$. At this point the current in the second inductance is at its maximum value, and it remains there.

Figure 7:
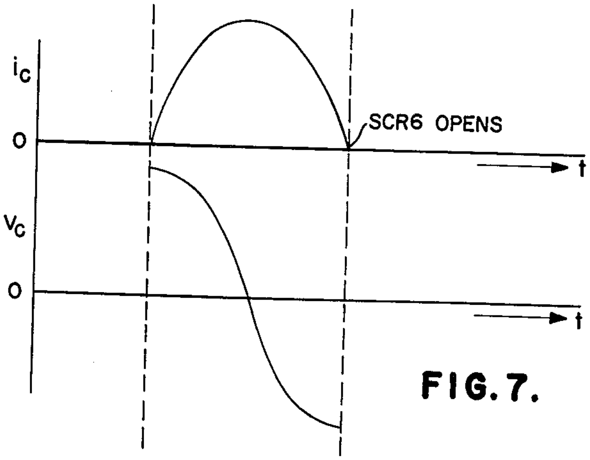
FIG. 7 are waveforms illustrating the operation of the circuit of FIG. 6.

At the termination of the transient by the opening of SCR5 the voltage on capacitor 24, given by Eq. 2, is at its peak value in the reverse polarity to its initial condition. In order to be ready to effect another switching operation, it is necessary to recharge capacitor 24 to the polarity shown in FIG. 3. Rather than draw a heavy surge of charging current from the power supply, represented by terminal 44, to recharge the capacitor, a transient very similar to the operation just described is used. In this case, the active circuit elements are capacitor 24, inductance 26 and SCR6. SCR6, which is non-conducting during the transfer of current from the first to the second inductance, is gated on by the trailing edge of the main switching transient through the action of transformer 30 and diode 32. The simplified circuit of FIG. 6 shows the circuit conditions just prior to the closure of SCR6. It will be noted that just prior to closure of the switch, the current in inductance 26 is zero. When the switch is closed, the current in capacitor 24 builds up sinusoidally as shown in FIG. 7, with the voltage across the capacitor $V_c$ decreasing sinusoidally. When the capacitor current transient goes to zero, SCR6 opens thus terminating the transient. At this point the potential on capacitor 24 has reversed polarity and has returned almost to its original value. SCR5 is open during the recharging transient whereby the latter transient does not effect the current in the then conducting parallel branch.

Applying the foregoing analysis to the circuit of FIG. 1, voltage on capacitor 24 is chosen so that when it is applied across the coil 10 carrying current in the direction shown, the capacitor voltage tends to decrease the current in coil 10. This initiates a transient in which the current in coil 10 follows the sinusoidal variation shown in FIG. 2*a*. Were it not for SCR1, the current would reverse its direction and follow the dotted curve of FIG. 2*a*. However, as was noted earlier, the silicon controlled rectifier conducts only in the forward direction. When the current in coil 10 reaches zero, which occurs if $$\frac{L_{10}}{C_{24}}$$

is equal to, or greater than $$\frac{V^2_{o24}}{I_1^2}$$

the voltage on capacitor 24, shown in FIG. 2*b*, has also fallen to zero. The current from the power supply 20 has now been transferred from coil 10 to the capacitor 24 as shown at *m* in FIG. 2*c*. During the next quarter cycle of the transient, the current in capacitor 24 decreases sinusoidally and increases sinusoidally in coil 14, SCR3 being still gated on by a positive pulse applied to the primary 50 of transformer $T_3$. When the current in capacitor 24 reaches zero, at *n* in FIG. 2*c*, SCR5 opens, and the voltage across inductance 18 collapses to zero, as indicated at *p* in FIG. 2*c*. The circuit is now in the steady state with a substantially constant current of magnitude $I_1$ flowing in the selected coil 14.

During this switching process, the voltage on capacitor 24 has reversed polarity. The pentode 40 connected as shown to a source of negative potential slowly restores the charge on capacitor 24 to its original state. To accomplish this restoration more quickly, SCR6 is connected in series with an inductance 26 across capacitor 24. SCR6 is triggered by pulse transformer 30, the primary of which is connected between the negative bus of the circuit and ground through a differentiating network of resistor 36 and capacitor 38. When the voltage across inductor 18 collapses at the end of the transient, pulse transformer 30 provides an output pulse to the gate electrode of SCR6 to trigger it on. The illustrated polarity of transformer 30, and the series diode 32, insure that only the voltage collapse at the end of the transient triggers SCR6. When this controlled rectifier is triggered, a transient is initiated in the L-C circuit involving capacitor 24 and inductance 26, which is independent of, but similar in action to the earlier described switching transient in the main circuit. The voltage and current vary sinusoidally as shown to the right of the second vertical dotted line in FIGS. 2*b* and 2*c*. When the current in capacitor again goes to zero, at *q* in FIG. 2*c*, SCR6 opens and the potential on capacitor 24 has returned almost to its original value. The pentode 40 supplies the small additional charge required to restore the capacitor to its full voltage. The circuit is now in readiness to be switched to any of the other coils 10, 12 or 16.

Should it next be desired to transfer the current to coil 12, for example, switching is initiated by application of a positive pulse to the primary 50 of transformer T2, the circuit thereafter automatically accomplishing transfer of the current from coil 14 in the manner described above. It is to be noted that during each switching sequence only the two branches between which current is being transferred, and the branch including capacitor 24, are affected, because of the characteristics of the silicon controlled rectifier. The diode 56 in the secondary 54 of each of pulse transformers T1 through T4 prevents feedthrough of the gating pulse applied to the selected branch to the gate-cathode circuits of the other SCR's. It will be apparent, therefore, that additional parallel branches may be added to the circuit of FIG. 1 should a particular application require more coils.

One particular advantage of this circuit is that no disabling signal need be applied to transfer current from one coil to another. A signal is applied only to that branch to which the current is to be transferred. The operation of the circuit being independent of past history greatly simplifies the logical control circuitry necessary to actuate this circuit.

In a circuit which has been satisfactorily operated, transfer of current from one coil to another was accomplished in 80 microseconds; i.e., 80 microseconds elapsed between the time of application of the triggering pulses to the selected pulse transformer until the current was at full value in the selected coil. Employing circuit parameters to achieve this speed of switching it was possible to switch from one branch to another about 250 to 300 times per second. It will be appreciated that the inductance of the coils, the value of capacitor 24, the operating voltages, and the ability of the pentode 40 to recharge capacitor 24 determine the switching time and limit the rate of switching. With appropriate selection of circuit parameters it appears possible to effect current transfer in about 20 microseconds at a rate of the order of 1000 cycles per second.

From the foregoing it has been seen that applicant has provided a switching circuit capable of rapidly transferring current from one coil or inductor to another, the transfer being initiated by merely applying a triggering signal to the branch to which it is desired to transfer the current. Upon triggering, the operation of the circuit is automatic, it being unnecessary to apply a disabling signal to the branch from which the current is being transferred. The operation of the circuit is independent of past history, greatly simplifying the control circuitry for initiating switching action.

While there has been described what is, at present, considered a preferred embodiment of the invention, it will now be apparent to ones skilled in the art that many and various changes and modifications may be made without departing from the spirit of the invention. For example, although the described circuit is particularly useful and efficient in the handling of appreciable current at relatively low voltages, by the substitution for the SCR's of other devices, such a thyratron, an ignitron, or a mercury arc rectifier, which have switching characteristics similar to the SCR, the circuit may be utilized in applications where the voltages are higher than can be withstood by the silicon controlled rectifier. It is intended, therefore, that all those changes and modifications as fairly fall within the scope of the appended claims be considered as part of the present invention.

What is claimed is:

1. A switching circuit comprising at least first and second parallel circuit branches each including an inductor between which current is to be switched, at least first and second switching devices each having anode, cathode and trigger electrodes and adapted to withstand large forward and reverse voltages and operative when triggered to conduct current in the forward direction only with low voltage drop, a common inductor connected in series with said parallel branches, a source of voltage having positive and negative terminals connected across said series circuit of parallel circuit branches and said inductor, said switching devices being so poled relative to said voltage source that current in the forward direction through said switching devices when conductive flows through said inductors, a third circuit branch connected in parallel with said parallel circuit branches and including a switching device characterized as aforesaid and a capacitor connected in series, separate means connected in the cathode-trigger circuit of the switching devices in said first and second parallel branches, for selectively applying triggering signals thereto, and means connected to said capacitor for supplying charging current thereto.

2. A switching circuit comprising at least first and second parallel circuit branches each including an inductor between which current is to be switched, at least first and second switching devices each having anode, cathode and trigger electrodes and adapted to withstand large forward and reverse voltages and operative when triggered to conduct current in the forward direction only with low voltage drop, a common inductor connected in series with said parallel branches, a source of voltage having positive and negative terminals connected across said series circuit of parallel circuit branches and said inductor, said switching devices being so poled relative to said voltage source that current in the forward direction through said switching devices when conductive flows through said inductors, a third circuit branch connected in parallel with said parallel circuit branches and including a switching device characterized as aforesaid and a capacitor connected in series, separate means connected in the cathode-trigger circuit of the switching devices in said first and second parallel branches, for selectively applying triggering signals thereto, each of said last-mentioned means being also coupled to the switching device in said third circuit branch for applying a triggering signal thereto in time coincidence with the triggering signal applied to the selected switching device in said parallel circuit branches, and means connected to said capacitor for supplying charging current thereto.

3. A switching circuit comprising at least first and second parallel circuit branches each including an inductor between which current is to be switched, at least first and second switching devices each having anode, cathode and trigger electrodes and adapted to withstand large forward and reverse voltages and operative when triggered to conduct current in the forward direction only with low voltage drop, a common inductor connected in series with said parallel branches, a source of voltage having positive and negative terminals connected across said series circuit of parallel circuit branches and said inductor, said switching devices being so poled relative to said voltage source that current in the forward direction through said switching devices when conductive flows through said inductors, a third circuit branch connected in parallel with said parallel circuit branches and including a switching device characterized as aforesaid and a capacitor connected in series, separate means connected in the cathode-trigger circuit of the switching devices in said first and second parallel branches, for selectively applying triggering signals thereto, each of said last-mentioned means being also coupled to the switching device in said third circuit branch for applying a triggering signal thereto in time coincidence with the triggering signal applied to the selected switching device in said parallel circuit branches, a current source connected to the junction of said capacitor and the switching device in series therewith, and means coupled to said capacitor operative upon completion of the transfer of current from one of said parallel branch inductors to another to rapidly reverse the polarity of said capacitor.

4. The circuit of claim 3 wherein said last-mentioned means includes an inductor and a switching device characterized as aforesaid serially connected in parallel with said capacitor, and means operative in response to the completion of the transfer of current to said other inductor to apply a triggering signal to the switching device in parallel with said capacitor.

5. The circuit of claim 3 wherein said last-mentioned means includes an inductor and a switching device characterized as aforesaid serially connected in parallel with said capacitor, and a pulse transformer coupled to the junction of said parallel branches and said common inductor and to the trigger electrode of the switching device in parallel with said capacitor, said pulse transformer being operative in response to the completion of the transfer of current to said other inductor to apply a triggering signal to said switching device in parallel with said capacitor.

6. A circuit for switching current from one of a plurality of inductors to a selected other one of said inductors comprising, a like plurality of parallel circuit branches each including one of said inductors connected in series with a silicon controlled rectifier having anode, cathode and trigger electrodes, a common inductor connected in series with said parallel circuit branches, a source of voltage having positive and negative terminals connected across said series circuit of parallel circuit branches and said inductor, said controlled rectifier being so poled in relation to the polarity of said source of voltage that current in the forward direction therethrough flows through said inductors, another circuit branch connected in parallel with said parallel circuit branches and including a silicon controlled rectifier poled as aforesaid connected in series with a capacitor, separate means coupled to the cathode-trigger circuit of the controlled rectifiers in said parallel circuit branches for selectively applying triggering signals thereto, and means connected to said capacitor for supplying charging current thereto.

7. A circuit for switching current from one of a plurality of inductors to a selected other one of said inductors comprising, a like plurality of parallel circuit branches each including one of said inductors connected in series with a silicon controlled rectifier having anode, cathode and trigger electrodes, a common inductor connected in series with said parallel circuit branches, a source of voltage having positive and negative terminals connected across said series circuit of parallel circuit branches and said inductor, said controlled rectifier being so poled in relation to said source of voltage that current in the forward direction therethrough flows through said inductors, another circuit branch connected in parallel with said parallel circuit branches and including a silicon controlled rectifier poled as aforesaid connected in series with a capacitor, separate means coupled to the cathode-trigger circuit of the controlled rectifiers in said parallel circuit branches for selectively applying triggering signals thereto, each of said last-mentioned means being also coupled to the cathode-trigger circuit of the controlled rectifier in series with said capacitor for applying a triggering signal thereto coincidental with the application of a triggering signal to a selected one of the controlled rectifiers in said parallel circuit branches, and means connected to said capacitor for supplying charging current thereto.

8. A circuit for switching current from one of a plurality of inductors to a selected other one of said inductors comprising, a like plurality of parallel circuit branches each including one of said inductors connected in series with a silicon controlled rectifier having anode, cathode and trigger electrodes, a common inductor connected in series with said parallel circuit branches, a source of voltage having positive and negative terminals connected across said series circuit of parallel circuit branches and said inductor, said controlled rectifier being so poled in relation to said source of voltage that current in the forward direction therethrough flows through said inductors, another circuit branch connected in parallel with said parallel circuit branches and including a silicon controlled rectifier poled as aforesaid connected in series with a capacitor, separate means coupled to the cathode-trigger circuit of the controlled rectifiers in said parallel circuit branches for selectively applying triggering signals thereto, each of said last-mentioned means being also coupled to the cathode-trigger circuit of the controlled rectifier in series with said capacitor for applying a triggering signal thereto coincidental with the application of a triggering signal to a selected one of the controlled rectifiers in said parallel circuit branches, a current source connected to the junction of said capacitor and its associated controlled rectifier, and means coupled to said capacitor operative upon completion of the transfer of current from one of said parallel branch inductors to another to rapidly reverse the polarity of said capacitor.

9. The circuit of claim 8 wherein said last-mentioned means includes an inductor and a silicon controlled rectifier serially connected in parallel with said capacitor, and means operative in response to the completion of the transfer of current to said selected one inductor to apply a triggering signal to the controlled rectifier in parallel with said capacitor.

10. The circuit of claim 8 wherein said last-mentioned means includes an inductor and a silicon controlled rectifier serially connected in parallel with said capacitor, and a pulse transformer coupled to the junction of said parallel branches and said common inductor and to the trigger electrode of the silicon controlled rectifier in parallel with said capacitor, said pulse transformer being operative in response to the completion of the transfer of current to said selected one inductor to apply a triggering signal to said controlled rectifier in parallel with said capacitor.

References Cited in the file of this patent

UNITED STATES PATENTS 2,706,257 Salati ---------------- Apr. 12, 1955
2,869,110 Wagner ---------------- Jan. 13, 1959